United States Patent

Smith

[11] Patent Number: 5,942,813
[45] Date of Patent: Aug. 24, 1999

[54] POWER SWITCHING CIRCUITS

[75] Inventor: Geoffrey Smith, Filton, United Kingdom

[73] Assignee: Matra BAe Dynamics (UK) Ltd., Hertfordshire, United Kingdom

[21] Appl. No.: 08/679,212

[22] Filed: Jul. 12, 1996

[30] Foreign Application Priority Data

Jul. 15, 1995 [GB] United Kingdom .................. 9514514

[51] Int. Cl.⁶ .................................................. H01H 47/00
[52] U.S. Cl. ............................................................. 307/125
[58] Field of Search ................................ 307/125, 126, 307/139, 140, 80, 85, 87, 112, 113, 116, 130, 98, 99; 340/600, 540; 323/265, 282, 299, 300, 311, 291, 292; 320/135, 136; 361/92, 86

[56] References Cited

U.S. PATENT DOCUMENTS

| | | | |
|---|---|---|---|
| 3,886,410 | 5/1975 | Seer, Jr. ..................................... | 361/86 |
| 3,968,421 | 7/1976 | Marcade . | |
| 3,988,643 | 10/1976 | Morris . | |
| 4,398,098 | 8/1983 | Minchey ................................. | 307/140 |
| 4,495,536 | 1/1985 | Bynum ..................................... | 361/91 |
| 4,507,569 | 3/1985 | Hess, II ................................... | 307/130 |
| 4,724,335 | 2/1988 | Bohner et al. .......................... | 307/140 |
| 4,731,550 | 3/1988 | Kraicar ..................................... | 307/140 |
| 5,010,321 | 4/1991 | Larner et al. ............................. | 340/66 |
| 5,012,121 | 4/1991 | Hammond et al. ....................... | 307/87 |
| 5,073,837 | 12/1991 | Baek ........................................ | 320/136 |
| 5,086,235 | 2/1992 | Marquet et al. . | |
| 5,179,337 | 1/1993 | Staarman et al. ........................ | 361/92 |
| 5,297,141 | 3/1994 | Marum ..................................... | 307/86 |
| 5,519,295 | 5/1996 | Jatnieks .................................... | 307/66 |
| 5,606,704 | 2/1997 | Pierce et al. ............................. | 395/750 |

FOREIGN PATENT DOCUMENTS

| | | |
|---|---|---|
| 0008564 | 3/1980 | European Pat. Off. . |
| 0175099 | 3/1986 | European Pat. Off. . |
| 0187369 | 7/1986 | European Pat. Off. . |
| 2269283 | 2/1994 | United Kingdom . |

OTHER PUBLICATIONS

Maxwell (S³ Division) Laboratories Inc. Application Note: 1986.

*Primary Examiner*—Richard T. Elms
*Attorney, Agent, or Firm*—Nixon & Vanderhye P.C.

[57] ABSTRACT

A switching circuit (3) having a low component count and suitable for use with a nuclear event detector circuit (2) provides a means for isolating a power source (1) from a load (2, 4). A bipolar transistor (5) provides a temperature insensitive, low voltage drop supply to the load (2, 4) and a MOSFET (7) provides base current to the bipolar transistor during standby mode; the MOSFET being turned on by the supply (1). When the supply voltage drops below the threshold voltage of the MOSFET (7), the base bias to the bipolar transistor (5) is removed. The bipolar transistor (5) cannot therefore conduct in the reverse sense and the circuit provides true isolation for the power supply (1) and the load (2, 4).

3 Claims, 1 Drawing Sheet

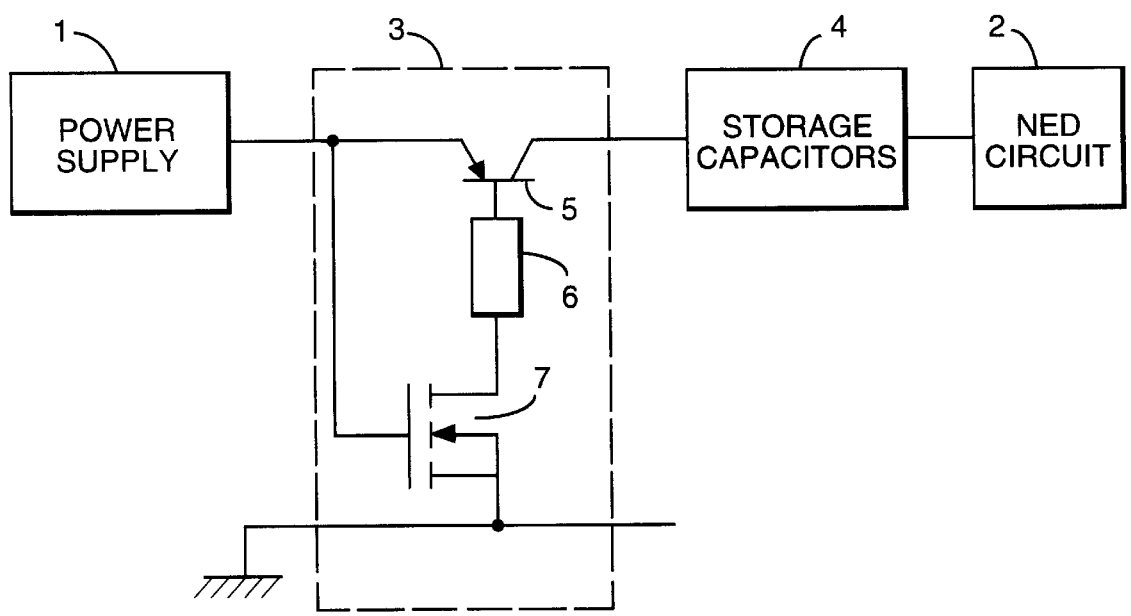

ly by the power supply ... (omitted)

POWER SWITCHING CIRCUITS

BACKGROUND OF THE INVENTION

1. Field of the Invention

This invention relates to power supply switching circuits and particularly, although not exclusively, to such circuits for use with nuclear event detectors.

2. Discussion of Prior Art

It is known that exploding nuclear weapons produce pulses of ionising radiation which can damage electronic components. To minimise the damage, it is necessary to shut down the power supply to the components as rapidly as possible. Known ways of achieving this involve the use of a nuclear event detector coupled to a protection circuit. For example, in response to an ionising pulse of radiation, the nuclear event detector generates a pulse which activates a power supply crowbar circuit. After a short period, when the components have recovered, the power is reapplied.

If the nuclear event detector (NED) shares the same power supply as the electronic components then a means for powering the NED during the time-out period is required. This is conventionally done using local storage capacitors. In addition there is a need for a switching circuit for isolating the storage capacitors from the power supply during the time-out period so that no leakage of current can occur. In addition the switching circuit must provide an adequate power supply to the NED during standby mode and maintain the NED supply at a voltage of at least 4.5V (assuming the NED component requirements are a nominal 5 Volts) during its operation.

The voltage drop of any circuit associated with supply isolation is a critical issue with conflicting requirements. For example, the higher the supply voltage, the higher is the power dissipation during standby. However, the lower the supply voltage, the less is the voltage drop that can be tolerated by the isolation circuit during standby. Another consideration is that the lower the NED supply (ie the supply voltage minus the voltage drop across the isolation circuit), the larger the storage capacitors need to be.

Maxwell Laboratories Inc. Application Note of 1986 describes two alternative power switching circuits for a nuclear event detector.

A first circuit relies on the use of a diode for isolating the local storage capacitance from a nominal 5 Volt power supply during the time-out period. However, because of the high forward voltage drop of the diode, this circuit must be operated from a power supply voltage approximately one diode drop (typically 0.5v to 1v) higher than the usual 5 volts required; which can be a disadvantage. Furthermore, as the voltage drop across the diode is comparatively high, the storage capacitors need to be quite large in order to compensate.

The second circuit proposed in the aforementioned Application Note employs a series pass transistor for isolation, which provides a low voltage drop which is largely independent of temperature. However, this configuration is believed to be flawed because when the power supply voltage is removed, the transistor becomes biased in the reverse sense (ie the collector behaves as the emitter and vice versa) and consequently bleeds current from the storage capacitors.

SUMMARY OF THE INVENTION

This invention aims to provide a power supply switching circuit, suitable for use with a nuclear event detector, which is simple in operation, with a low component count and having none of the aforementioned disadvantages of the known arrangements.

According to this invention a switching circuit comprises; a series pass transistor connected between a power supply and a load, and a MOSFET transistor, biased by the power supply, for controlling a bias current to the series pass transistor, whereby when the power supply is shut down, the MOSFET transistor switches off, removing the bias current from the series pass transistor and thereby causing said series pass transistor to switch off, whereby the load is isolated from the power supply.

The use of a MOSFET ensures complete turn-off of the series pass transistor because the gate of a MOSFET is completely isolated from its source and drain whereas this would not be so, were a bipolar transmitter to be used instead.

BRIEF DESCRIPTION OF THE DRAWINGS

An embodiment of the invention will now be described, by way of example only, with reference to the drawing which is a schematic circuit diagram of a power isolation switching circuit incorporated in a nuclear event detector.

DETAILED DESCRIPTION OF PREFERRED EMBODIMENTS

Shown in the drawing is a power supply 1 for supplying power to a nuclear event detector (NED) circuit 2 and to other components (not shown) which are to be protected by the action of the NED circuit 2.

The power supply 1 is linked to the NED circuit 2 via a power isolation switching circuit 3 and a bank of storage capacitors 4.

The switching circuit 3 comprises a series pass bipolar PNP transistor 5 for supplying a charging current to the bank of storage capacitors 4 from the power supply 1, the emitter of the transistor 5 being connected to the power supply 1 and its collector to the capacitor bank 4. The base of the transistor 5 is connected via a bias resistor 6 to the drain of an N-channel MOS Field Effect Transistor (MOSFET) 7. The gate of the MOSFET 7 is connected to the power supply 1.

With the power supply 1 a nominal 5 Volts, the MOSFET 7 is chosen to have a threshold voltage of nominally 2–4 Volts and the bias resistor, typically 3.3 KOhms. The PNP series pass bipolar transistor 5 is chosen for its small collector-emitter saturation voltage so that a low voltage drop is maintained across it.

During standby mode, the MOSFET 7 is switched on by the power supply 1 thereby supplying base current to the series pass bipolar transistor 5. Hence, the bipolar transistor 5 is also turned on during standby and thus supplies charging current to the storage capacitors 4 from the power supply 1. This supply has a low voltage drop and is temperature insensitive.

On receiving an ionising pulse, the action of the NED circuit 2 will shut down the power supply 1 by means of conventional control circuitry (not shown). Once the power supply voltage drops below the threshold of the MOSFET 7, the MOSFET 7 will switch off, thus removing bias current from the bipolar transistor 5. The bipolar transistor cannot therefore conduct in the reverse sense thereby providing complete isolation of the power supply 1 from the storage capacitors 4.

The value of the storage capacitance C is given by:

$$C = \frac{[I_{NED(MAX)} + I_{PIC(MAX)}]T_{(MAX)}}{V_{IN(MIN)} - V_{PIC(MAX)} - V_{NED(MIN)}}$$

where:

$I_{NED(MAX)}$=maximum NED active current
$I_{PIC(MAX)}$=maximum power isolation circuit leakage current
$T_{(MAX)}$=maximum NED output pulse width
$V_{(MIN)}$=minimum power supply voltage
$V_{PIC(MAX)}$=maximum power isolation circuit voltage drop at the NED standby current
$V_{NED(MIN)}$=minimum NED operating voltage Hence, because the switching circuit of the invention has inherently low values of $I_{PIC(MAX)}$ and $V_{PIC(MAX)}$, the ability to keep the required storage capacitance value, C, to a minimum, is assured.

I claim:

1. A power supply switching circuit comprising;
a series pass transistor connected between a power supply and a load, and
a MOSFET transistor having a gate connected directly to the power supply and for controlling a bias current to the series pass transistor, whereby when the power supply is shut down, the MOSFET transistor switches off, removing the bias current from the series pass transistor and thereby causing said series pass transistor to switch off, whereby the load is isolated from the power supply.

2. A power supply switching circuit according to claim 1 in which the series pass transistor is a bipolar PNP transistor.

3. A power supply switching circuit according to claim 1 including a bias resistor connected between a drain of the MOSFET and a gate of the series pass transistor for limiting bias current applied to the gate of the series pass transistor.

* * * * *